A. H. HARRIS.
HAND SWITCH FOR AUTOMOBILES.
APPLICATION FILED OCT. 18, 1916.
1,280,457. Patented Oct. 1, 1918.
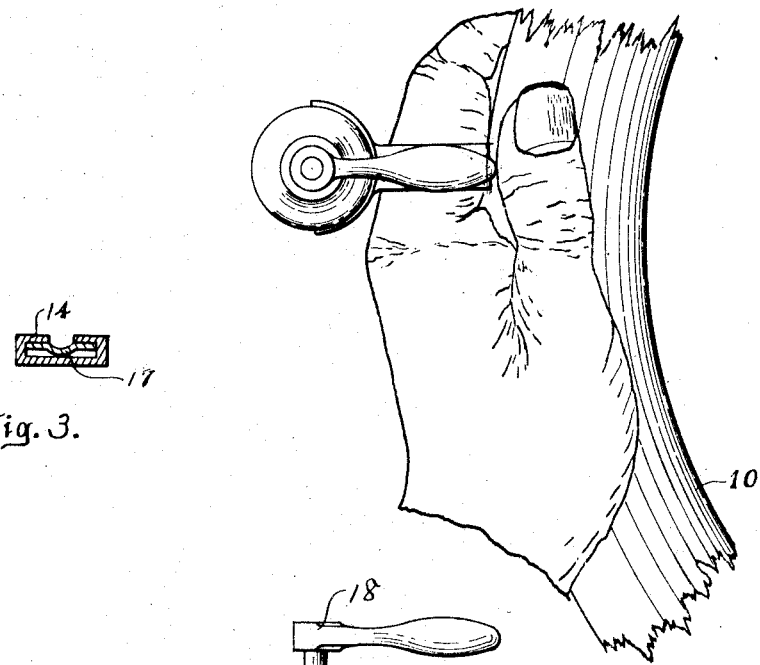
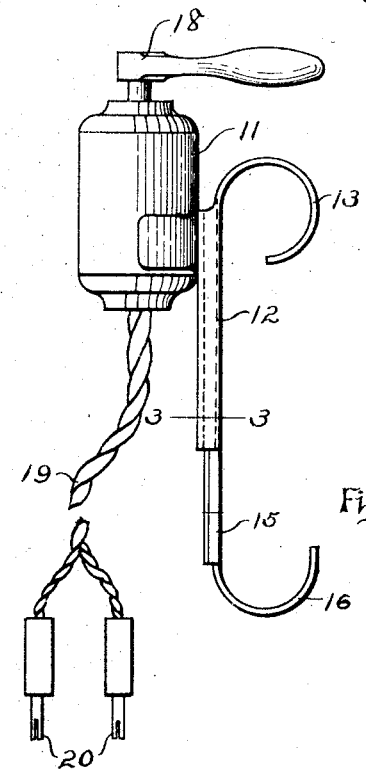
Fig. 3.
Fig. 1.
Fig. 2.
WITNESSES:
Edwin J. Wright.
INVENTOR.
BY Archer H. Harris.
G. L. Ely
ATTORNEY

UNITED STATES PATENT OFFICE.

ARCHER H. HARRIS, OF BARBERTON, OHIO.

HAND-SWITCH FOR AUTOMOBILES.

1,280,457.  Specification of Letters Patent.  Patented Oct. 1, 1918.

Application filed October 18, 1916. Serial No. 126,426.

*To all whom it may concern:*

Be it known that I, ARCHER H. HARRIS, a citizen of the United States, residing at Barberton, in the county of Summit, State of Ohio, have invented certain new and useful Improvements in Hand-Switches for Automobiles, of which the following is a specification.

It is well known that in the construction of automobiles in which the switch controlling the headlights is found on the cowl in front of the driver or on a box on the steering post, in turning the light on and off while driving, the driver's attention must be diverted from the operation of steering and one hand must be taken off the steering wheel. This is a dangerous operation to perform while driving, especially along a narrow road at night.

It is the object of this invention to eliminate the necessity of removing the hand from the steering wheel to turn the lights on or off and to construct a switch in such a manner that the operation of controlling the lights may be performed by the driver mechanically.

In the drawings I have shown a switch and holder which I believe will eliminate the dangers referred to.

Figure 1, is a plan view showing the hand of a car driver and a fragment of a steering wheel in the manner in which it may be used.

Fig. 2, is an elevation of the switch showing the connection to the car.

Fig. 3, is a cross-section on the line 3—3 of Fig. 2.

It is obvious that various changes and modifications may be made in the form shown without departing from the spirit of the invention, or sacrificing any of its benefits.

In Fig. 1, of the drawing a fragment of the steering wheel of an automobile is shown at 10, the hand of the driver being shown grasping the same and carrying across the back of the fingers the switch which forms the subject of this invention.

The main body of the switch is indicated at 11 and may be of any suitable form, but preferably of a kind adapted to snap on and off readily. To the back of the switch is secured in any suitable manner the main or body portion of a clamp which is indicated at 12, one end being provided with a curved portion 13 adapted to pass over the forefinger of the car driver. In the base of 12 is formed a channel guideway 14 in which is slidably received the other half of the clamp 15 which is provided with a curved end 16 adapted to be received over the little finger of the hand. A curved formation 17 in the center of strip 16 serves to maintain the parts 12 and 15 in sliding adjustment.

An operating member 18 of any suitable style is carried on the upper end of the switch in such a position as to be near the thumb of the operator when in position. This may be of any suitable form and I do not consider myself limited to a lever such as shown. Flexible wires 19 depend from the switch and may be connected to plugs 20 adapted to be received in sockets on the cowl of the machine or at any suitable place, and to be readily removable therefrom.

Claim—

In a portable switch designed to be carried on the hand, the combination of a clamp adapted to be mounted across the back of the hand, a snap switch secured to the end of the clamp nearest the thumb of the operator, an operating lever extending from the switch in the direction of the thumb, and conducting wires leading from the switch.

ARCHER H. HARRIS.

Witness:
A. L. ELY.

Copies of this patent may be obtained for five cents each, by addressing the "Commissioner of Patents, Washington, D. C."